(12) United States Patent
Hou et al.

(10) Patent No.: US 11,896,553 B2
(45) Date of Patent: Feb. 13, 2024

(54) CONTINUOUS SKIN PACKAGING AND COATING APPARATUS AND COATING METHOD FOR TABLETS

(71) Applicant: SHANGHAI MODERN PHARMACEUTICAL ENGINEERING RESEARCH CENTER CO., LTD., Shanghai (CN)

(72) Inventors: Huimin Hou, Shanghai (CN); Chunping Yuan, Shanghai (CN); Huiping Zhang, Shanghai (CN); Chunlin Luo, Shanghai (CN); Mingying Qian, Shanghai (CN); Zhengfang Wang, Shanghai (CN); Yunmei Ren, Shanghai (CN)

(73) Assignee: SHANGHAI MODERN PHARMACEUTICAL ENGINEERING RESEARCH CENTER CO., LTD.

( * ) Notice: Subject to any disclaimer, the term of this patent is extended or adjusted under 35 U.S.C. 154(b) by 653 days.

(21) Appl. No.: 17/053,759

(22) PCT Filed: Jun. 20, 2019

(86) PCT No.: PCT/CN2019/092126
§ 371 (c)(1),
(2) Date: Nov. 6, 2020

(87) PCT Pub. No.: WO2020/010994
PCT Pub. Date: Jan. 16, 2020

(65) Prior Publication Data
US 2021/0212898 A1    Jul. 15, 2021

(30) Foreign Application Priority Data
Jul. 10, 2018   (CN) .......................... 201810750341.9

(51) Int. Cl.
*B65B 11/52*     (2006.01)
*A61J 3/00*     (2006.01)
(Continued)

(52) U.S. Cl.
CPC ................ *A61J 3/005* (2013.01); *B65B 9/04* (2013.01); *B65B 9/045* (2013.01); *B65B 11/52* (2013.01);
(Continued)

(58) Field of Classification Search
CPC .......... B65B 9/04; B65B 9/045; B65B 11/52; B65B 41/16; B65B 51/16; B65B 47/10; B65B 47/08; B65B 47/00
(Continued)

(56) References Cited

U.S. PATENT DOCUMENTS 4,154,636 A * 5/1979 Motoyama ............... A61K 9/28
                                                156/243
5,682,733 A * 11/1997 Perrone .................... B65B 9/04
                                                   53/553
(Continued)

FOREIGN PATENT DOCUMENTS

CN       202061099 U    12/2011
CN       107792417 A    3/2018
(Continued)

OTHER PUBLICATIONS

International Search Report for PCT/CN2019/092126, dated Aug. 1, 2019, 2 pages.
(Continued)

*Primary Examiner* — Jacob A Smith
(74) *Attorney, Agent, or Firm* — Quarles & Brady LLP

(57) ABSTRACT

A continuous skin packaging and coating apparatus and a coating method for tablets. The continuous skin packaging and coating apparatus comprises a lower coating film unreel-
(Continued)

ing roller, a waste edge reeling roller, an upper coating film unreeling roller, a lower coating film heating component, an upper coating film heating component, a first mold provided with a first tablet placing hole, a second mold provided with a second tablet placing hole, a heat-sealing plate, a cutting component, a blank tablet implanting component, and an operating mesa. The lower coating film unreeling roller and the waste edge reeling roller are provided on either side of the operating mesa. The lower coating film heating component, the blank tablet implanting component, the upper coating film unreeling roller, the upper coating film heating component, the heat-sealing plate, and the cutting component are sequentially provided above the operating mesa. The first mold is provided under the operating mesa below the blank tablet implanting component. The second mold is provided under the operating mesa below the heat-sealing plate. The upper coating film heating component is provided below the upper coating film unreeling roller.

8 Claims, 1 Drawing Sheet

(51) Int. Cl.
| | | |
|---|---|---|
| *B65B 41/16* | (2006.01) | |
| *B65B 51/16* | (2006.01) | |
| *B65B 9/04* | (2006.01) | |
| *B65B 51/10* | (2006.01) | |

(52) U.S. Cl.
CPC .............. *B65B 41/16* (2013.01); *B65B 51/16* (2013.01); *A61J 2200/42* (2013.01); *B65B 2051/105* (2013.01)

(58) Field of Classification Search
USPC .................................. 53/509, 246, 453, 560
See application file for complete search history.

(56) References Cited

U.S. PATENT DOCUMENTS

| 6,238,616 | B1* | 5/2001 | Ishikawa ................... B65B 1/32 53/553 |
| 6,755,010 | B2* | 6/2004 | Draisey ............. B29C 66/83513 53/374.3 |
| 2013/0025243 | A1* | 1/2013 | Spix ........................ B65B 57/02 83/13 |
| 2016/0251148 | A1* | 9/2016 | Edwards ................. B65B 47/06 206/461 |

FOREIGN PATENT DOCUMENTS

| CN | 108888514 A | 11/2018 |
| JP | 2009196958 A | 9/2009 |

OTHER PUBLICATIONS

Extended European Search Report for PCT/CN2019/092126, dated Jul. 29, 2021, 8 pages.

* cited by examiner

CONTINUOUS SKIN PACKAGING AND COATING APPARATUS AND COATING METHOD FOR TABLETS

CROSS-REFERENCE TO RELATED APPLICATION

This application is a national stage application for International Application PCT/CN2019/092126, filed on Jun. 20, 2019, entitled "CONTINUOUS SKIN PACKAGING AND COATING APPARATUS AND COATING METHOD FOR TABLETS", which claims the priority benefit of Chinese Patent Application No. 201810750341.9, filed on Jul. 10, 2018. The entireties of both applications are incorporated by reference herein for all purposes.

TECHNICAL FIELD

The present disclosure relates to a coating apparatus and a coating method for tablets.

BACKGROUND

Enteric coating is a film coated on the outside of tablets that is resistant to gastric acid but is soluble in the intestinal tract. Controlled release coating is a semi-permeable film coated on the outside of tablets that is insoluble in gastric acid and intestinal juice, inert but is water-permeable. The former is to release the drug in the intestinal tract to reduce gastric irritation, and the latter is to release the drug in the digestive tract at a predetermined rate, which is often used to reduce the fluctuation of drug plasma concentration, reduce side effects, and maintain the efficacy for 12 to 24 hours.

The preparation method of coating the tablets with an enteric coating or a controlled release coating usually includes: after the film material is dissolved in a volatile organic solvent (such as ethanol, acetone, etc.), it is atomized and sprayed on the surface of the tablets by compressing air with a sprayer in a sugar coating pan, a high-efficiency coating pan, or a fluidized bed, and dried, then sprayed and dried repeatedly several times, until a complete film coating with desired thickness is formed on the outer surface of the tablets. This method has the following disadvantages:

1. The volatile organic solvent used is flammable and explosive, and must be produced in an explosion-proof workshop with high cost.
2. A large amount of organic solvents volatilize into the air to cause pollution, unless expensive recovery devices are installed. For example, in order to produce a certain kind of 1 million controlled-release tablets, about 500 kg acetone is needed to dissolve the coating material cellulose acetate (CA).
3. Atomized coating droplets cannot be completely coated on the surface of the tablets. When they reach the surface of the tablets, part of them are dried to form solid dust and are removed with exhaust air. This not only causes waste of the coating material, but also causes environmental pollution.
4. Such coating process is performed in batches, which has become a bottleneck in the continuous production of tablets and has not been resolved.
5. Spray coating is a highly experienced operation. There are many factors that affect the film formation and the properties of the film, such as the location of the spray gun, the temperature and humidity during operation, the concentration of the coating material, the control of the thickness of the coating layer, etc., which all affect the release rate of the drug.
6. The pan coating process is not suitable for coating tablets, such as flat tablets, triangular tablets, square tablets, etc. Since flat surface has a large area when they are in contact with each other, the undried coating liquid will make the two tablets stick together and not be easily separated after drying. Forced separation will cause the rupture of the coating film and affect the integrity of the coating. Fluidized bed is not suitable for the coating of large tablets, as it requires more airflow to fluidize it, which results in greater tablet wear and more dust.
7. In general, after the enteric coating and the controlled release coating is completed, the coatings need to keep being dried for a longer time. In addition, they all need to be further coated with a layer of water-soluble shading coating, which adds another process.

At present, the domestic and international overview of enteric and controlled release coating technologies is as follows:

The coating technologies are divided into: organic solvent coating, dry coating, water-based coating and other coating technologies.

1. Organic Solvent Coating
   (1) Coating pan process. At present, the most common traditional coating pans are rarely used for enteric coating, release control coating, shading coating, etc., at home and abroad, but they are still used for rolling and coating for pellets in domestic Chinese medicine factories.
   (2) High-efficiency coating pan is reformed and innovated on the basis of the traditional sugar coating pan, which is currently the mainstream of the coating for enteric-coated tablets and controlled-release tablets. (Document: Introduction of several fast tablet coating machines and their principles, Hou Huimin, Foreign Medicine. Synthetic Medicine. Biochemical Medicine. Preparations Volume, 1980, 2, P51-53)
   (3) Efficient continuous coating common coating pots of long barrel multi-sprayers are pear-shaped flat round pots, and the high-efficiency coating machine also has a flat barrel shape. The tablets to be coated are put in one time, and then taken out in one time after the coating is completed, i.e., batch production. In the film-coating machine in Germany, a long row of spray heads are placed in a long tubular barrel, and the tablets enter from one end of the barrel to the other end to complete the coating and then flow out, continuous coating is thus achieved. (Document: Research and discussion on a continuous running film-coating machine, He Cong, et al. Electromechanical Information, 2010, 29, P51)
   (4) Fluidized bed tablet spray coating. Pharmaceutical industry has generally adopted fluidized bed to perform drying, granulation, granule coating, tablet coating and the like.

The thickness of the coating is critical to the release of the drug. To measure the thickness, the coating film on the tablet is usually peeled off and the thickness is measured directly. Weight increase method may also be used to measure the thickness of the film. In recent years, it has been reported that near-infrared or Raman spectroscopy is used in the coating process to continuously measure the thickness of the coating film.

2. Dry Coating
(1) Electrostatic pressure coating for tablets. Hou Huimin et al. synthesized a gastric acid-soluble thermoplastic styrene-vinylpyridine copolymer (China Pharmaceutical Industry 1(20), 1973). Hou et al. electrostatically adsorbed the powder on the punch and die of a self-made tablet press. While pressing the tablet, the powder was pressed on the outside of the tablet, and a plastic film was formed under the action of pressure and heat (the punch and die were both warm). (Exploration of electrostatic dry powder coating process for tablets, Hou Huimin, China Pharmaceutical Industry, 6(11), 1981).
(2) Electrostatic plasticized dry powder coating for tablets. Tablets are put in a coating pan, and the polymer material powders to be coated are sprayed into the coating pan using a spray gun with negative high voltage. Since the polymer materials are negatively charged, they are adsorbed on the positively charged tablets (the coating pan is grounded, so the tablets are relatively positively charged). Then corresponding plasticizers are sprayed, and then powders are sprayed, and hot air is blown thereto, to plasticize the coating powders. These steps are repeated to form a coating film (Document: Application progress of slow and controlled release coating technology and polymer coating materials, Wang Jingmin et al., Zhongnan Pharmaceutical, 2013, 11(8), P853).

3. Water Dispersion Coating

Water dispersion coating technology is a new type of coating technology, including aqueous solution coating, water suspension coating and water dispersion coating. Since water-based coating technology uses water as a dispersion system and causes almost no environmental pollution, it effectively solves a series of environmental problems caused by organic solvent coating and has become the mainstream coating technology for modern pharmaceutical preparations. Among them, the water dispersion coating technology is developing fastest and has been widely used in production practice. However, the water-based coating technology still has problems such as too long aging time after coating, special requirements for tablet cores, and unsuitability for certain drug coatings sensitive to temperature and humidity.

(1) Cellulose acetate (CA) water dispersion coating. Ju Chengyi et al. successfully prepared a CA aqueous dispersion with sodium lauryl sulfate as the emulsifier by the emulsification-solvent evaporation method. The dispersion had a median diameter of 0.162 μm. A CA aqueous dispersion free film was prepared by using the aqueous dispersion as the basic material and glycerol diacetate as the plasticizer, and then the venlafaxine hydrochloride osmotic pump controlled release tablet was prepared.
(2) Acrylic resin water dispersion and ethyl cellulose (EC) water dispersion. Commercially available finished coating materials for oral sustained and controlled release solid preparations include Aquacoat (manufactured by FMC Company) series and Surfer (manufactured by Colorcon Company) series products with EC water dispersion as the basic film-forming material, and Eudragit series (manufactured by Rohm Company, Germany) products with acrylic resin as the film-forming material. (Document: Application of coating technology in oral sustained and controlled release solid preparations, Wang Li et al., Pharmaceutical Research, 2017, Vol. 36, No. 2P108-110)

4. Other Coating Technologies
(1) Asymmetric membrane coating technology. Tablets are firstly immersed in a mixed organic solvent of the controlled release coating, taken out and then immersed in water, and taken out and dried after a certain period of time, to obtain a porous asymmetric membrane. (Document: Asymmetric-membrane tablet coatings for osmotic drug delivery, S. M. Herbig, Journal of ControlledRelease, 35(1995), 127-136)
(2) Production process of asymmetric controlled release membrane capsules. CA is used as the coating material, and the asymmetric controlled release membrane is prepared by the same method as above, and then filled with drug, and the body cap is sealed to obtain the asymmetric controlled release membrane capsule (Document: Asymmetric membrane capsules for osmotic drug delivery I. A. G. Thombre, Development of a manufacturing process Journal of Controlled Release, 57(1999), 55-64).
(3) Preparation of composite coating membrane. Using the above-mentioned similar method, the capsule membrane is prepared in two steps. At step 1, a controlled-release asymmetric membrane is formed. At step 2, a pH-sensitive asymmetric membrane is prepared with the same method to obtain a composite membrane capsule. The drug is not released in stomach, and the outer membrane is ruptured in intestinal tract, and the drug starts to be pushed out according to the osmotic pump mechanism. (Document: Asymmetric membrane in membrane capsules: A means for achieving delayed and osmotic flow of cefadroxil. Anil K. Philip, European Journal of Pharmaceutics and Biopharmaceutics, 69(2008), 658-666).

There are many defects in the above methods and substantial changes are needed.

SUMMARY

An object of the present disclosure is to provide a continuous skin packaging and coating apparatus and a coating process for tablets to overcome the defects of the prior art.

A continuous skin packaging and coating apparatus for tablets includes a lower coating film unreeling roller, an upper and lower composite coating film scrap edge reeling roller, an upper coating film unreeling roller, a lower coating film heating component, an upper coating film heating component, a first mold provided with a first tablet placing hole, a second mold provided with a second tablet placing hole, a heat-sealing plate, a cutting component, a tablet core implanting component, and an operating platform.

Wherein the lower coating film unreeling roller and the upper and lower composite coating film scrap edge reeling roller are provided on both sides of the operating platform, respectively.

Wherein the lower coating film heating component, the tablet core implanting component, the upper coating film unreeling roller, the upper coating film heating component, the heat-sealing plate, and the cutting component are sequentially provided above the operating platform, the first mold is provided under the operating platform below the tablet core implanting component, the second mold is provided under the operating platform below the heat-sealing plate, and the upper coating film heating component is provided below the upper coating film unreeling roller.

The beneficial effect of the present disclosure is: it is an innovative coating method that has not been reported at home and abroad. The coating method is a coating technology that is environmentally friendly and beneficial to people, without volatile solvents and dust; a coating technology that greatly reduces manufacturing costs, which does not require solvents, dust recovery devices and explosion-proof workshops; a coating technology that is suitable for automatic and intelligent continuous production, wherein the thickness of the film coating is controllable and adjustable, and the reproducibility of mass production and quality uniformity are good; a coating technology that can design different permeability properties according to different drug characteristics, which is easier to control drug quality; a coating technology that is suitable for enteric-coated tablets, osmotic pump tablets, flat tablets not suitable for coating pans, and heavier tablets not suitable for fluidized beds of various shapes; a coating technology in which drugs with good water solubility can be used directly without pore formation by laser; a coating technology that can produce a film having colorants and sunscreens, and avoids coating a light-proof coating outside the controlled release film.

DETAILED DESCRIPTION OF THE EMBODIMENTS

Figure 1:
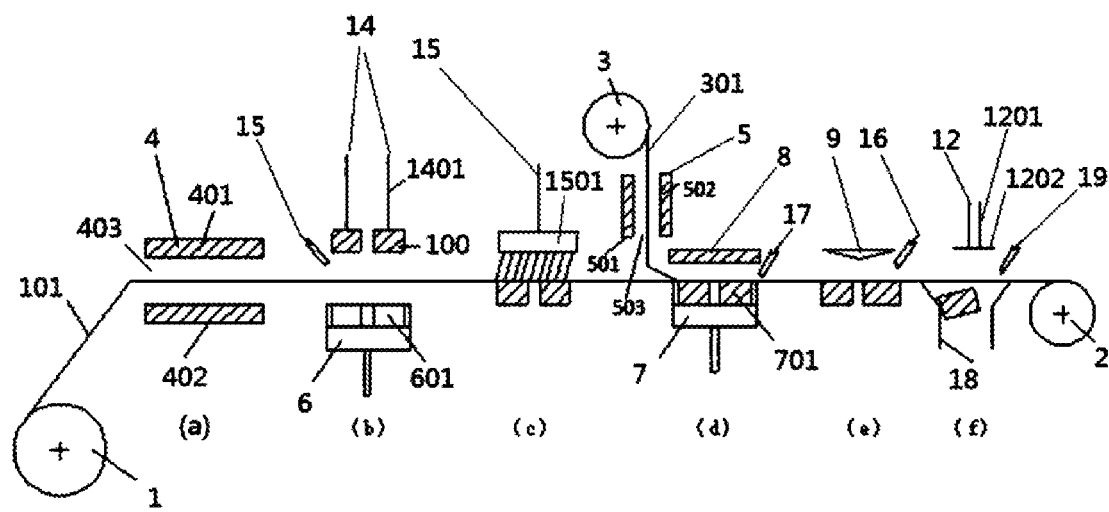
FIG. 1 is a continuous skin packaging and coating apparatus for tablets.
Figure 2:
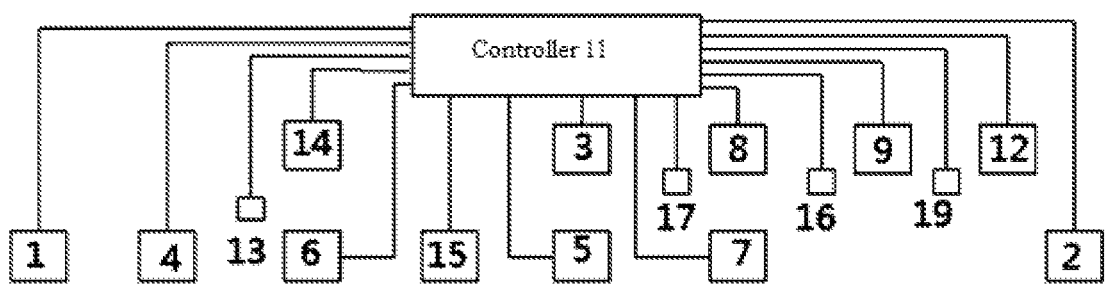
FIG. 2 is a circuit diagram.

Referring to FIGS. 1 and 2, a continuous skin packaging and coating apparatus for tablets of the present disclosure includes a lower coating film unreeling roller 1, an upper and lower composite coating film scrap edge reeling roller 2, an upper coating film unreeling roller 3, a lower coating film heating component 4, an upper coating film heating component 5, a first mold 6 provided with a first tablet placing hole 601, a second mold 7 provided with a second tablet placing hole 701, a heat-sealing plate 8, a cutting component 9, a tablet core implanting component 14, and an operating platform.

The lower coating film unreeling roller 1 and the upper and lower composite coating film scrap edge reeling roller 2 are provided on both sides of the operating platform, respectively.

The lower coating film heating component 4, the tablet core implanting component 14, the upper coating film unreeling roller 3, the upper coating film heating component 5, the heat-sealing plate 8, and the cutting component 9 are sequentially provided above the operating platform. The first mold 6 is provided under the operating platform below the tablet core implanting component 14. The second mold 7 is provided under the operating platform below the heat-sealing plate 8. The upper coating film heating component 5 is provided below the upper coating film unreeling roller 3.

Preferably, the shapes of the bottom surfaces of the first tablet placing hole 601 and the second tablet placing hole 701 match with the shape of the bottom surface of the tablet core 100, and the bottom surface of the heat-sealing plate 8 is provided with a tablet placing hole that matches with the shape of the top surface of the tablet core.

The shapes of the bottom and top surfaces of the tablet core include flat, spherical, and elliptical surfaces. It should be noted that the first hole 601, the second hole 701, and the bottom surface of the heat-sealing plate 8 may have any shape, as long as they match with the shape of the tablet core.

Preferably, the tablet core implanting component 14 includes a vacuum tube 1401 connected to a vacuum system.

The cutting component 9 is preferably a laser cutting machine, which is a universal device in the art, and a commercial product may be adopted.

Preferably, a tablet pushing component 12 is included, which is provided on the other side of the cutting component 9. The tablet pushing component 12 includes a tablet pushing rod 1201 and a tablet pushing plate that is provided at a lower portion of the tablet pushing rod 1201. The table pushing component 12 is provided with a power mechanism.

Preferably, the lower coating film heating component 4 includes an upper heating plate 401 and a lower heating plate 402, and a lower coating film 101 channel 403 is provided between the upper heating plate 401 and the lower heating plate 402.

Preferably, the upper coating film heating component 5 includes a left heating plate 501 and a right heating plate 502, and an upper coating film channel 503 is provided between the left heating plate 501 and the right heating plate 502.

Preferably, a coated tablet collecting device 18 is further included, which is provided under the operating platform below the tablet pushing component 12.

Preferably, an adhesive coating device 15 is further included, which is provided between the first mold 6 and the upper coating film unreeling roller 3. The adhesive coating device is provided with a coating brush 1501, and a lower end of the coating brush is in contact with the lower coating film 101.

Preferably, the first mold 6, the second mold 7, the tablet core implanting component 14, and the tablet pushing component 12 are each provided with a power mechanism, such as a motor or a cylinder, to enable up-and-down movements of the first mold 6, the second mold 7, the tablet core implanting component 14 and the tablet pushing component 12.

Preferably, a controller 11, a first position sensor 13, a second position sensor 17, a third position sensor 16, and a fourth position sensor 19 are further included.

The first position sensor 13 is provided at the first mold 6 and is electrically connected to the controller 11 for transmitting the position signal of the tablet core 100 to the controller 11 to control the action of the first mold 6.

The second position sensor 17 is provided at the second mold 7 and is electrically connected to the controller 11 for transmitting the position signal of the tablet core 100 coated with the upper coating film 301 to the controller 11 to control the action of the second mold 7.

The third position sensor 16 is provided at the cutting component 9 and is electrically connected to the controller 11 for transmitting the position signal of the coated tablet reaching the cutting component 9 to the controller 11 to control the action of the cutting component 9.

The fourth position sensor 19 is provided at the tablet pushing component 12 and is electrically connected to the controller 11 for transmitting the position signal of the cut tablet reaching the tablet pushing component 12 to the controller 11 to control the action of the tablet pushing component.

The upper and lower composite coating film scrap edge reeling roller 2, the upper coating film unreeling roller 3, the lower coating film heating component 4, the upper coating film heating component 5 and the heat-sealing plate 8 are electrically connected to the controller 11, respectively. The power mechanisms of the first mold 6, the second mold 7, the tablet core implanting component 14, and the tablet pushing component are electrically connected to the controller 11, respectively.

The adhesive coating device 15 is electrically connected to the controller 11.

Further, the present disclosure also includes a rack, on which the coating film unreeling roller 1, the upper and lower composite coating film scrap edge reeling roller 2, the upper coating film unreeling roller 3, the lower coating film heating component 4, the upper coating film heating component 5, the first mold 6, the second mold 7, the heat-sealing plate 8, the cutting component 9, the tablet core implanting component 14, the first position sensor 13, the second position sensor 17, the third position sensor 16, the fourth position sensor 19 and other components may be installed.

The continuous skin packaging and coating method for tablets using the above-mentioned apparatus includes the following steps:

(1) The lower coating film unreeling roller 1, the upper and lower composite coating film scrap edge reeling roller 2, and the upper coating film unreeling roller 3 are started, so that the lower coating film 101 sequentially passes through the channel 403 between the upper heating plate 401 and the lower heating plate 402 of the lower coating film heating component 4, the tablet core implanting component 14, the first mold 6 provided with the first tablet placing hole 601, the second mold 7 provided with the second tablet placing hole 701, and the cutting component 9. The upper coating film 301 sequentially passes through the upper coating film channel 503 between the left heating plate 501 and the right heating plate 502 of the upper coating film heating component 5, the heat-sealing plate 8, the second mold 7, the cutting component 9 and the tablet pushing component.

(2) When the lower coating film 101 moves to a station (a), it passes through the lower coating film heating component 4, and is heated and softened by the upper heating plate 401 and the lower heating plate 402. Then the tablet cores 100 are implanted into the first tablet placing hole 601 of the first mold 6 via the vacuum tube 1401 of the tablet core implanting component 14, to obtain half-finished skin packaged and coated tablets. In this process, the tablets and the coating materials are completely skin packaged, so it is called "skin packaging and coating".

(3) The first mold 6 moves downwards, and the half-finished skin packaged and coated tablets continues to move rightwards.

(4) The half-finished skin packaged and coated tablets move rightwards to a station (d), and enter into the second tablet placing hole 701 of the second mold 7. The upper coating film 301 that is heated and softened by the upper coating film heating component 5 covers the upper surface of the half-finished skin packaged and coated tablets. The second mold 7 moves upwards and is pressed on the heat-sealing plate 8, so that the tablet cores are compounded with the upper coating film in the tablet placing hole of the bottom surface of the heat-sealing plate.

(5) The second mold 7 moves downwards to obtain coated tablets, and the coated tablets move to a station (e).

(6) The cutting component 9 is started to cut the coated tablets from the heat-sealed upper and lower coating films, and then move them to a station (f). The coated tablets are pushed into a collecting device 18 by the tablet pushing component, to obtain products. The scrap edges are reeled by the upper and lower composite coating film scrap edge reeling roller 2.

Preferably, between the step (3) and step (4), the method further includes a process of coating adhesive on the lower coating film with the adhesive coating device 15, so as to ensure the complete sealing of the upper coating film and the lower coating film.

The materials of the upper coating film and the lower coating film are all common in the field, and film-forming materials, plasticizers, porogenic agents, colorants, surfactants, stabilizers, etc. are all pharmaceutical.

Preparation method of coating film is as follows:

The film-forming materials, plasticizers, porogenic agents and other materials are mixed uniformly, dried, and if necessary, vacuumed to remove moisture and air in the mixture to minimize bubbles in the film.

The mixture is extruded by an ordinary screw extruder used in the plastic industry, and the temperature of different extrusion section is set according to the properties of the polymer materials. The extruder has a flat opening to extrude a sheet (which may be adjusted depending on the thickness, width, etc.). The sheet is calendered by a secondary heating roller to obtain a coating film of the desired thickness, which is rolled up for later use. The thickness of the coating film is generally 10 to 500 μm.

What is claimed is:

1. A continuous skin packaging and coating apparatus for tablets, comprising a lower coating film unreeling roller, an upper and lower composite coating film scrap edge reeling roller, an upper coating film unreeling roller, a lower coating film heating component, an upper coating film heating component, a first mold provided with a first tablet placing hole, a second mold provided with a second tablet placing hole, a heat-sealing plate, a cutting component, a tablet core implanting component, and an operating platform; wherein the lower coating film unreeling roller and the upper and lower composite coating film scrap edge reeling roller are provided on both sides of the operating platform, respectively;

wherein the lower coating film heating component, the tablet core implanting component, the upper coating film unreeling roller, the upper coating film heating component, the heat-sealing plate, and the cutting component are sequentially provided above the operating platform, the first mold is provided under the operating platform below the tablet core implanting component, the second mold is provided under the operating platform below the heat-sealing plate, and the upper coating film heating component is provided below the upper coating film unreeling roller; and wherein a tablet pushing component provided on the other side of the cutting component comprises a tablet pushing rod and a tablet pushing plate provided at a lower portion of the tablet pushing rod, and the tablet pushing component is provided with a power mechanism.

2. The continuous skin packaging and coating apparatus for tablets according to claim 1, wherein the lower coating film heating component comprises an upper heating plate and a lower heating plate, and a lower coating film channel is provided between the upper heating plate and the lower heating plate, the upper coating film heating component comprises a left heating plate and a right heating plate, and an upper coating film channel is provided between the left heating plate and the right heating plate.

3. The continuous skin packaging and coating apparatus for tablets according to claim 1, further comprising a coated tablet collecting device provided under the operating platform below the tablet pushing component.

4. The continuous skin packaging and coating apparatus for tablets according to claim 3, further comprising an adhesive coating device provided between the first mold and the upper coating film unreeling roller, wherein the adhesive coating device is provided with a coating brush, and a lower end of the coating brush is in contact with the lower coating film.

5. The continuous skin packaging and coating apparatus for tablets according to claim 4, wherein the first mold, the second mold, and the tablet core implanting component are each provided with a power mechanism.

6. The continuous skin packaging and coating apparatus for tablets according to claim 5, further comprising a controller, a first position sensor, a second position sensor, a third position sensor, and a fourth position sensor;
wherein the first position sensor is provided at the first mold and is electrically connected to the controller;
the second position sensor is provided at the second mold and is electrically connected to the controller;
the third position sensor is provided at the cutting component and is electrically connected to the controller;
the fourth position sensor is provided at the tablet pushing component and is electrically connected to the controller;
the upper and lower composite coating film scrap edge reeling roller, the upper coating film unreeling roller, the lower coating film heating component, the upper coating film heating component, and the heat-sealing plate are electrically connected to the controller, respectively, the power mechanisms of the first mold, the second mold, the tablet core implanting component, and the tablet pushing component are electrically connected to the controller, respectively, and the adhesive coating device is electrically connected to the controller.

7. A continuous skin packaging and coating method for tablets, comprising the following steps:
(1) starting a lower coating film unreeling roller, a upper and lower composite coating film scrap edge reeling roller, and an upper coating film unreeling roller, passing a lower coating film sequentially through a channel between an upper heating plate and a lower heating plate of a lower coating film heating component, a tablet core implanting component, a first mold provided with a first tablet placing hole, a second mold provided with a second tablet placing hole, and a cutting component, passing an upper coating film sequentially through an upper coating film channel between a left heating plate and a right heating plate of an upper coating film heating component, a heat-sealing plate, the second mold, the cutting component, and a tablet pushing component;
(2) when the lower coating film moves to a station (a), passing the lower coating film through the lower coating film heating component while being heated and softened by the upper heating plate and the lower heating plate, and implanting a tablet core into the first tablet placing hole of the first mold via a vacuum tube of the tablet core implanting component, thus obtaining a half-finished skin packaged and coated tablet;
(3) moving the first mold downwards, and continuing to move the half-finished skin packaged and coated tablet rightwards;
(4) when the half-finished skin packaged and coated tablet moves rightwards to a station (d), entering, by the half-finished skin packaged and coated tablet, into the second tablet placing hole of the second mold, coating the upper coating film that is heated and softened by the upper coating film heating component on the upper surface of the half-finished skin packaged and coated tablet, and moving the second mold upwards to press a heat-sealing plate, compounding the tablet core with the upper coating film in the tablet placing hole of the bottom surface of the heat-sealing plate;
(5) moving the second mold downwards to obtain a coated tablet, and moving the coated tablets to a station (e); and
(6) starting the cutting component to cut the coated tablet from the heat-sealed upper and lower coating films, and then moving the coated tablet to a station (f), pushing the coated tablet into a collecting device by the tablet pushing component, obtaining a product, and reeling scrap edges by the upper and lower composite coating film scrap edge reeling roller.

8. The method according to claim 7, wherein between step (3) and step (4), the method further comprises a process of coating an adhesive on the lower coating film by an adhesive coating device.

* * * * *